(No Model.) 4 Sheets—Sheet 2.

C. E. HADLEY.
RESILIOMETER.

No. 524,546. Patented Aug. 14, 1894.

(No Model.) 4 Sheets—Sheet 3.

C. E. HADLEY.
RESILIOMETER.

No. 524,546. Patented Aug. 14, 1894.

(No Model.)　　　　　　　C. E. HADLEY.　　　4 Sheets—Sheet 4.
RESILIOMETER.
No. 524,546.　　　　　　　Patented Aug. 14, 1894.
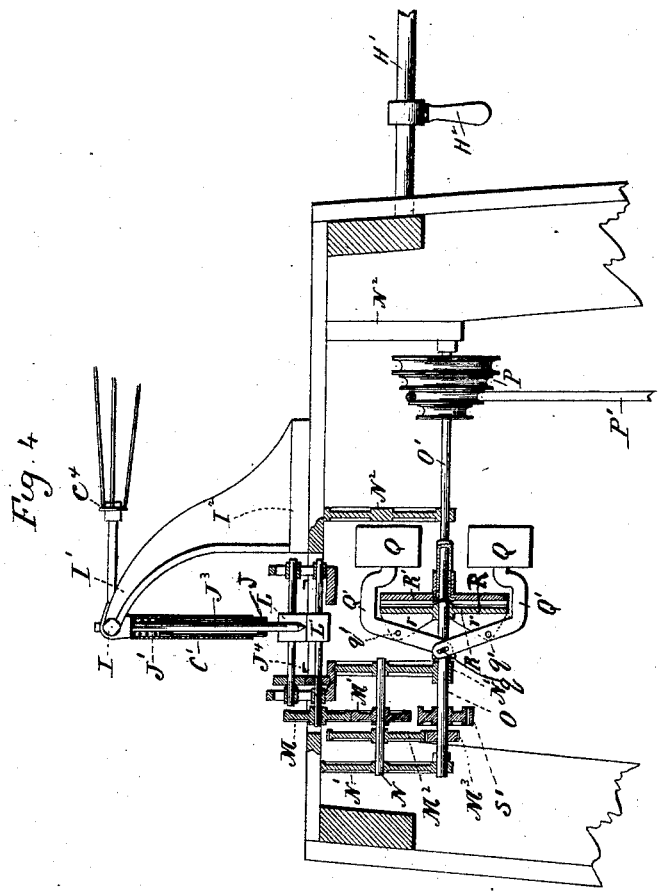
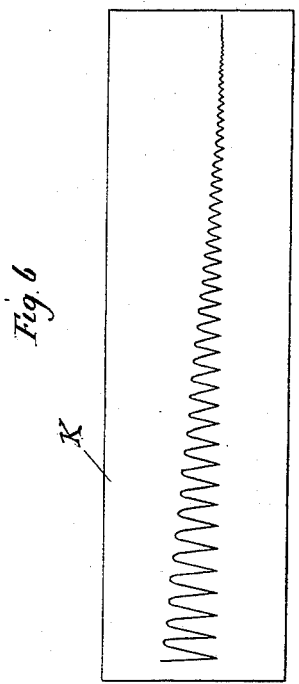

UNITED STATES PATENT OFFICE.

CHARLES E. HADLEY, OF CHICOPEE, MASSACHUSETTS, ASSIGNOR TO THE OVERMAN WHEEL COMPANY, OF HARTFORD, CONNECTICUT, AND CHICOPEE FALLS, MASSACHUSETTS.

RESILIOMETER.

SPECIFICATION forming part of Letters Patent No. 524,546, dated August 14, 1894.

Application filed March 24, 1894. Serial No. 504,980. (No model.)

*To all whom it may concern:*

Be it known that I, CHARLES E. HADLEY, of Chicopee, in the county of Hampden and State of Massachusetts, have invented a new Improvement in Resiliometers; and I do hereby declare the following, when taken in connection with accompanying drawings and the letters of reference marked thereon, to be a full, clear, and exact description of the same, and which said drawings constitute part of this specification, and represent, in—

Figure 1:
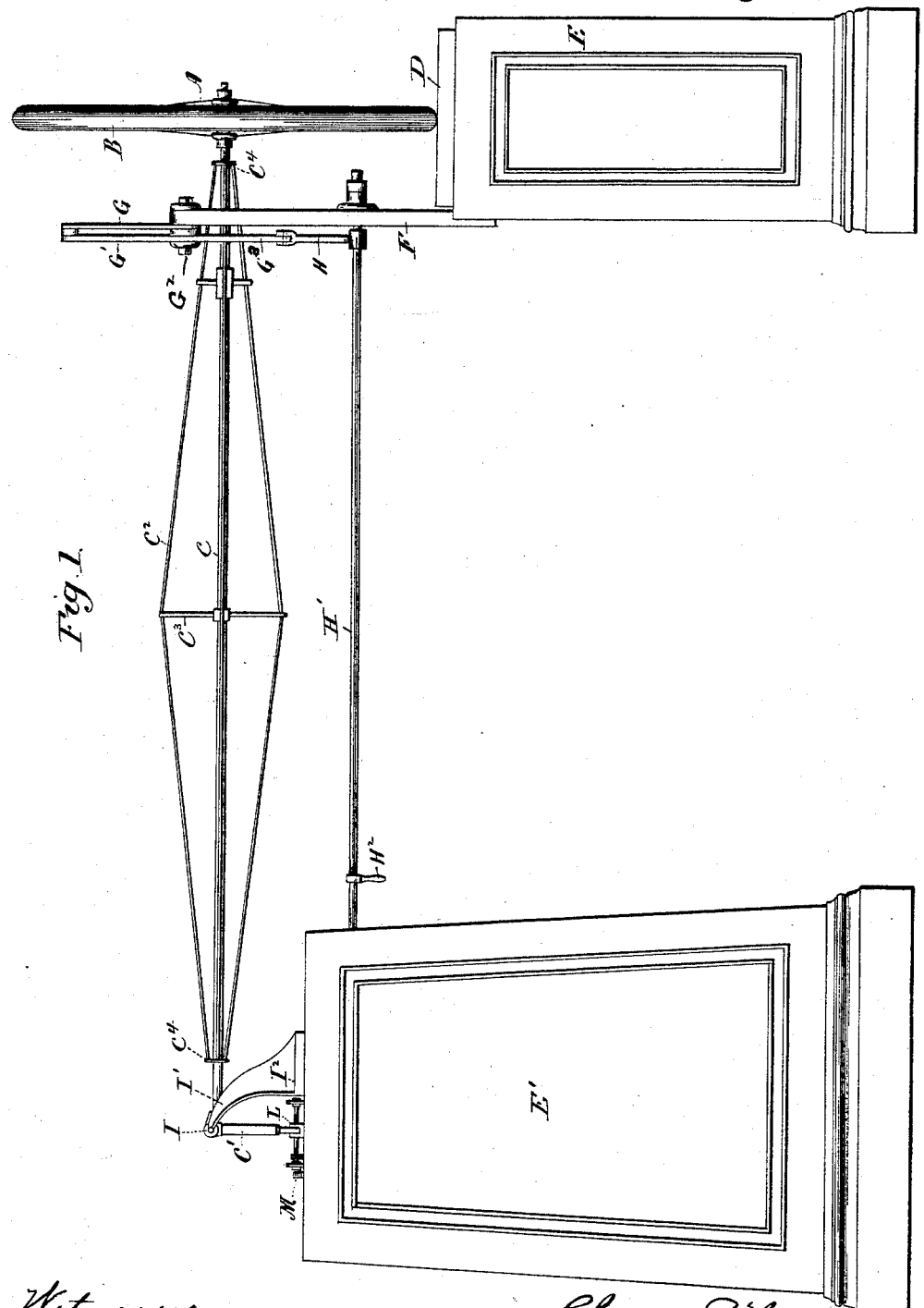
Figure 2:
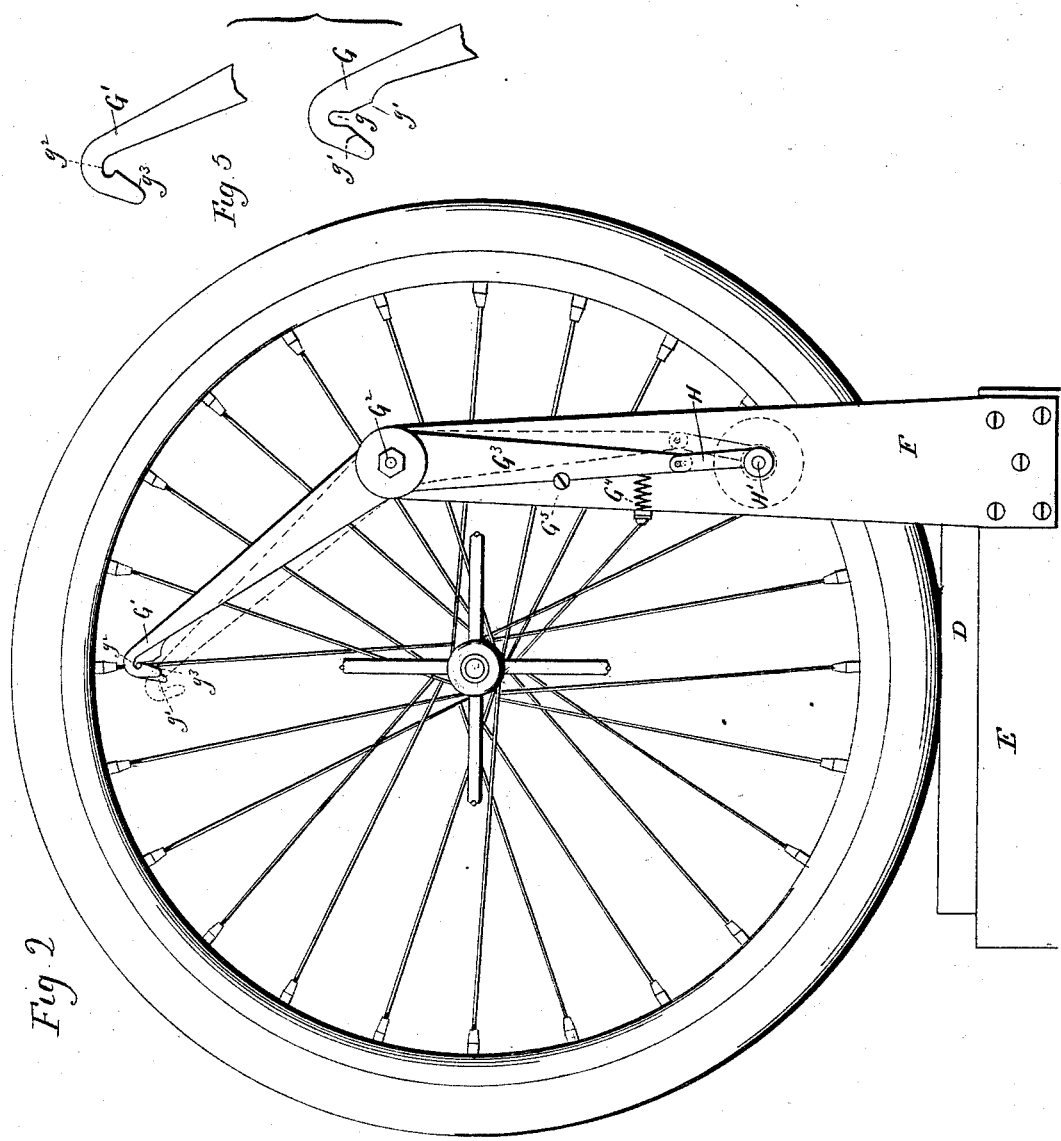
Figure 3:
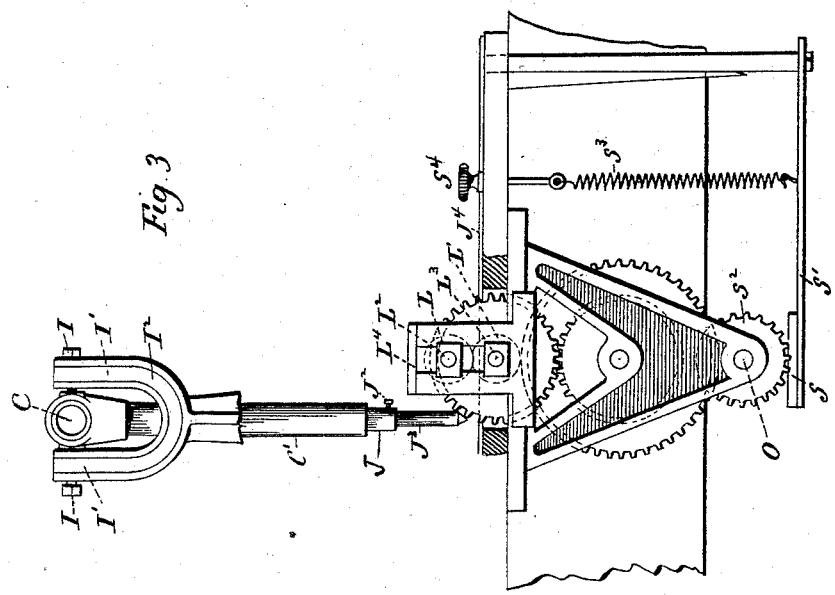

Figure 1, a view in side elevation of one form which a resiliometer constructed in accordance with my invention may assume; Fig. 2, a view in end elevation on a larger scale looking toward the wheel; Fig. 3, a view in end elevation of the opposite end of the device showing the recording and feeding mechanism; Fig. 4, a view in vertical longitudinal section of the same end of the device; Fig. 5, an enlarged view of the upper ends of the two hooks of the drop mechanism; Fig. 6, a plan view of one form which the tablet may assume.

My invention relates to an improvement in testing machines, and more particularly to a machine designed with reference to testing pneumatic tires for bicycles, to determine questions of relative resiliency, the object being to produce for the purpose mentioned, a machine which shall with unquestioned accuracy indicate the exact resilient quality of a bicycle tire. As descriptive of the function of the machine, I have chosen to call it a resiliometer, and shall so refer to it hereinafter in the description and claims.

With these ends in view, my invention consists in a machine having certain details of construction and combinations of parts as will be hereinafter described and pointed out in the claims.

In carrying out my invention, I may construct the machine in several different ways, but however constructed it will contain means for supporting the bicycle-wheel so as to permit the same to rebound with the least resistance, a recording device arranged to partake of every rebound of the wheel and accurately record the same upon a suitable tablet, and mechanism for feeding the tablet under the recording device. As herein shown, the wheel A, with its pneumatic tire B, is applied to the free end of a long horizontally arranged beam C, forming the long arm of a lever, the short arm C' of which extends downward at a right angle to it, and will be described later on. The said beam C is reinforced and stiffened on the suspension principle by means of four stay-wires $C^2$, strained over a four-armed bridge $C^3$, located about midway of its length, and connected to collars $C^4$ $C^4$ located near its ends. I do not, however, limit myself to forming the beam in the manner described, although that results in a light and extremely rigid construction. Beneath the outer end of the beam I locate an anvil or base-plate D, which is mounted in the top of a standard E.

By preference the anvil will consist of a very heavy plate of steel, but it may be made of other material, and mounted otherwise than shown, the only requirement being, so far as the anvil is concerned, that an absolutely unyielding surface shall be provided for the wheel to bound and rebound upon.

To the standard E, I secure an upright F, furnished at its extreme upper end with an inwardly inclined rigid hook G, and a correspondingly inclined pivotal hook G' mounted on a horizontal stud $G^2$ and constructed with a tail $G^3$, which is pivotally connected with a short crank-arm H, carried by a horizontal rock or trip-shaft H', the adjacent end of which is journaled in the lower portion of the said upright, while its opposite end is journaled in the other upright E', and provided with an operating handle $H^2$. The extreme upper end of the rigid hook G is constructed with a vertical notch $g$ opening downward, and with two beveled faces $g'$ $g'$, respectively converging to the open lower end of the said notch, while the corresponding end of the pivotal hook is constructed with an undercut horizontal notch $g^2$, and a single beveled face $g^3$, which is longer than the other faces mentioned, the said notches $g$ $g^2$ being adapted to receive the upper stay-wire $C^2$ of the beam C, as will be explained later on.

A spiral spring $G^4$ mounted in the upright F and secured to the inner edge of the tail G³ of the pivotal hook G', is arranged to exert a constant effort to keep the said pivotal hook in alignment with the fixed hook. To prevent the said spring from pulling the pivotal hook outward beyond the fixed hook, a stop G⁵ consisting of a screw, is located in the upright F, in position to be engaged by the inner edge of the tail when the two hooks coincide, as shown in Fig. 2. The said hooks and the rock-shaft constitute, as may be said, a drop-mechanism, which may take different forms, although the form shown is well adapted to the purpose. The lever comprising the said suspension beam C and the short arm C' aforesaid, is suspended by centers I I between the arms I' I' of a bracket I², secured to the top of the standard E' which as shown is considerably larger than the standard E before mentioned. As thus constructed and arranged, the beam C and arm C' vibrate together in a vertical plane. The arm C' is tubular, and receives a tubular reciprocal pencil-holder J, and a spiral spring J' located above and tending to depress the same, the said pencil-holder being furnished with a binding-screw J² for securing a recording pencil J³ in it.

It will be clear that inasmuch as the arm C' must partake of every movement, however slight, of the beam C, the marks made by the pencil will accurately record the movements of the beam. The record made by the pencil is preserved upon a tablet, which is fed under the pencil at a predetermined, even speed through a horizontal guide J⁴ mounted upon the table formed by the top of the standard E'.

One form of tablet which may be used is shown in Fig. 6 of the drawings, and designated by the letter K, but obviously any tablet may be used. The said arm C', the tubular pencil-holder J, its actuating spring J' and the pencil J³, form the recording mechanism of my improved machine as herein shown.

For feeding the tablet at an even speed under the pencil as the same is vibrating back and forth over it, I employ, as herein shown, a feeding mechanism comprising a driven feed-roll L, which is entirely located above the surface of the table, and a driving feed-roll L', the upper edge of which extends very slightly above the surface of the table. These rolls are respectively mounted upon shafts L² and L³, which are journaled in a frame L⁴. The shaft L³, which is the driving-shaft, is connected with some convenient source of power. It is apparent that it may be driven in a great variety of ways. As herein shown it is furnished at one end with a pinion M, meshing into a smaller pinion M', mounted upon a shaft N, journaled in hangers N', located within the standard E'. The said shaft N also carries a gear M², which meshes into a pinion M³, carried by the main driving shaft comprising two sections O and O', which are journaled in the lower ends of the hangers N' N' mentioned, and two corresponding hangers N² N² also located within the standard E, the section O' of the shaft carrying a cone of pulleys P over one of which runs a belt P', driven from any convenient source of power.

In order to regulate the speed of the feed-rolls L and L', I interpose a regulator in the feeding mechanism. The regulator employed may assume a variety of different forms. As herein shown, it consists of two weights Q Q, secured to the outer ends of two arms Q' Q', having their inner ends constructed with elongated slots, and connected by means of a pin q, passing through the said slots, with the section O of the shaft, the said levers being also connected by means of pins q' q' with flanges r r formed upon the outer face of a friction disk R, mounted so as to move back and forth upon the section O of the shaft, and arranged to normally engage with a corresponding friction disk R' rigidly secured to the adjacent end of the section O' of the shaft. The section O of the shaft projects beyond the inner face of the disk R, and takes a bearing in a counterbore in the enlarged adjacent end of the shaft O', whereby the two shafts are coupled together by the engagement of the friction disks and by the frictional engagement of the projecting end of the shaft O within the chambered end of the shaft O'.

It is designed that the weights Q Q shall be proportioned in weight to the power employed, so that normally the two friction disks will bear against each other and couple the two sections of the shafts together. In case, however, the speed of the section O' exceeds the speed determined upon for running the feed-rolls L L', the weights Q Q are thrown apart by centrifugal force, and the friction-disks R and R' momentarily separated, leaving the two sections of the shafts connected only by the frictional bearing of one within the other, whereby the speed of the section O of the shaft will be almost immediately so reduced that the weights will come together again and re-engage the movable friction disk with the fixed friction disk. By preference I shall also employ an auxiliary regulator consisting of a brake-shoe S, carried by a lever S' and arranged to engage with the periphery of a brake-wheel S², mounted on the section O of the shaft, and drawn against the said wheel with variable resistance, by means of a spiral spring S³ connected with the lever at its lower end, and at its upper end with an adjusting screw S⁴, mounted in the top of the standard E'. This auxiliary regulator may be used if occasion requires, to impose additional load, so to speak, upon the section O of the shaft, and might be used, for instance, when the frictional bearing of one section of the shaft in the other, transmitted more power to the section O of the shaft than was required for driving the feed-rolls L and L' under the resistance of the recording pencil.

In testing a pneumatic tire in my resiliometer, a wheel having the tire applied to it is attached to the outer end of the beam, the upper stay-wire C² of which is pressed upward against the bevels g' g' of the fixed hook, and the bevel g³ of the pivotal hook. The pivotal hook is thus caused to move a little to permit the wire to pass up through the vertical notch g of the fixed hook, and to be brought into line with the horizontal notch g² of the pivotal hook which then recovers under the influence of the spring G⁴, so as to engage the wire, as shown in Fig. 2. The beam and hence the wheel, are thus suspended through the medium of the pivotal hook and the uppermost stay wire C². The wheel is thus suspended above the anvil D at a fixed predetermined height. Now when the rock-shaft H' is turned slightly by means of its handle H², the pivotal hook will be thrown inward, as indicated by broken lines in Fig. 2, and release the stay wire, whereupon the beam and the wheel carried by it will be dropped and fall under the action of gravity until the pneumatic tire applied to the wheel strikes the anvil D, upon which the wheel will then bound and rebound until gravity and friction gradually overcome the capacity of the tire to recover. While the wheel and beam are thus vibrating up and down, the pencil is vibrating in a shorter arc, but in exact accordance with the vibrations of the wheel, and making a record of all those vibrations upon a tablet, which was started in motion under the pencil simultaneously with the dropping of the wheel. The character of that record is shown by the tablet K forming Fig. 6 of the drawings.

It will be readily understood that the number of vibrations of the wheel and their length will depend solely upon the resiliency of the tire, and it will be clear that the relative resiliency of two tires, or a series of tires may be determined with absolute accuracy by successively placing them under corresponding conditions in the machine, and operating the same, as set forth.

I do not limit myself to constructing the machine as described, for other means might be employed to support it while rebounding and recording its rebounds upon a tablet moved at a uniform rate of speed with respect to the recording device. I would therefore have it understood that I do not limit myself to the exact construction herein shown and described, but hold myself at liberty to make such changes and alterations as fairly fall within the spirit and scope of my invention.

I am aware, however, that devices constructed and arranged to record vibrations upon a record-blank, and comprising a recording device and means for feeding the blank thereto, are old, and I do not claim such a construction broadly.

Having fully described my invention, what I claim as new, and desire to secure by Letters Patent, is—

1. In a resiliometer, the combination with a beam pivotally mounted at one end and adapted to have a pneumatic tired wheel secured to its opposite or free end, of a recording instrument connected with the pivotal end of the beam so as to partake of its movement, and a feeding mechanism to feed a tablet while the recording instrument is making a record upon the same, substantially as described.

2. In a resiliometer, the combination with a beam pivotally mounted at one end, and having its opposite or free end adapted to have a pneumatic tired wheel removably applied to it, of a drop mechanism for temporarily supporting the wheel and beam at a fixed predetermined height from which they are dropped to cause the wheel to rebound, a recording instrument partaking of the vibrations of the beam and hence of the wheel, and a feeding mechanism for feeding a tablet under the recording instrument while it is making a record upon the same, substantially as described.

3. In a resiliometer, the combination with a beam pivotally mounted at one end and adapted at its opposite or free end to have a pneumatic tired wheel removably attached to it, of a drop mechanism for supporting the beam and wheel at a fixed predetermined height from which they are dropped to bound the wheel, and comprising a fixed and a pivotal hook and means for operating the latter, a recording instrument connected with the opposite end of the beam, and partaking of the vibrations thereof, and a feeding mechanism for feeding a tablet while the said instrument is making a record upon it, substantially as described.

4. In a resiliometer the combination with a beam pivotally mounted at one end and adapted at its opposite or free end to have a pneumatic tired wheel removably attached to it, of a drop mechanism for supporting the beam and wheel at a fixed predetermined height, from which they are dropped to bound the wheel, a recording instrument mounted in a short arm rigidly connected with the pivoted end of the beam, and partaking of the vibrations thereof, a feeding mechanism for feeding a tablet while the said instrument is making a record upon it, and means for regulating the action of the feeding mechanism, substantially as described.

5. In a resiliometer, the combination with a beam pivotally mounted at one end and adapted at its opposite or free end to have a pneumatic tired wheel removably attached to it, a drop mechanism for supporting the beam and wheel at a fixed predetermined height, from which they are dropped to bound the wheel, and comprising a fixed and a pivotal hook, and means for operating the latter, a recording pencil mounted in a reciprocal holder, located in a short arm depending from the pivoted end of the beam, a tablet-guide below the said pencil, feed-rolls for drawing the tablet through the said guide and under the pencil as the same is vibrating back and forth, and means for driving the said feed-rolls at a uniform rate of speed, substantially as described.

In testimony whereof I have signed this specification in the presence of two subscribing witnesses.

CHARLES E. HADLEY.

Witnesses:
EUGENE L. RUSSELL,
CHARLES E. W. WOODWARD.